(12) United States Patent
Jeon

(10) Patent No.: US 8,581,015 B2
(45) Date of Patent: Nov. 12, 2013

(54) APPARATUS FOR RESTORING WASTE PLASTIC TO OIL

(75) Inventor: Ki Jeong Jeon, Gimpo-si (KR)

(73) Assignee: Eco Creation International, Inc., Palisades Park, NJ (US)

( * ) Notice: Subject to any disclaimer, the term of this patent is extended or adjusted under 35 U.S.C. 154(b) by 874 days.

(21) Appl. No.: 12/731,691

(22) Filed: Mar. 25, 2010

(65) Prior Publication Data

US 2011/0120851 A1    May 26, 2011

(51) Int. Cl.
*C07C 1/00*    (2006.01)
*C10G 1/10*    (2006.01)

(52) U.S. Cl.
USPC .............. 585/241; 201/2.5; 201/33; 202/118; 202/208; 202/247; 422/224; 422/229

(58) Field of Classification Search
USPC ............ 585/241; 202/118, 208, 247; 201/2.5, 201/33; 422/224, 229
See application file for complete search history.

(56) References Cited

U.S. PATENT DOCUMENTS

| | | | |
|---|---|---|---|
| 5,342,421 A * | 8/1994 | Breu | 96/279 |
| 5,811,606 A | 9/1998 | Yang | |
| 6,172,271 B1 * | 1/2001 | Horizoe et al. | 585/241 |
| 7,371,308 B1 * | 5/2008 | Hackl et al. | 201/25 |
| 7,416,641 B2 * | 8/2008 | Denison | 202/99 |
| 7,893,307 B2 * | 2/2011 | Smith | 585/241 |
| 8,193,403 B2 * | 6/2012 | DeWhitt | 585/241 |

* cited by examiner

*Primary Examiner* — Nina Bhat
(74) *Attorney, Agent, or Firm* — IM IP Law PLLC; C. Andrew Im

(57) ABSTRACT

Apparatus and method for restoring plastics to oil, thereby efficiently recycling waste plastics, comprises a decomposer, an oil reduction body, a cooling tank, and a filter and emission part. The decomposer comprises a decomposition space comprising an opening to receive the plastic, a heating coil inside the decomposer to heat the decomposition space to pyrolyze the plastic, and a pyrolyzing gas exhaust pipe to exhaust pyrolyzing gas produced in pyrolyzing the plastic. The oil reduction body is divided into a cooling space and a oil catchment space by a partition. The cooling tank provides cooling water to the cooling space to cool and reduce the pyrolyzing gas to oil, which is collected in the oil catchment space.

20 Claims, 10 Drawing Sheets

APPARATUS FOR RESTORING WASTE PLASTIC TO OIL

RELATED APPLICATION

This application claims priority from Korean Patent Application No. 2009-0113636 filed Nov. 23, 2009, which is incorporated herein by reference in its entirety.

TECHNICAL FIELD

The invention relates to an apparatus and method for restoring waste plastic to oil, thereby efficiently recycling waste plastic.

BACKGROUND OF THE INVENTION

Basically, plastic is resin product capable of being heated and pressurized. Plastic can be formed into various shapes by heating and pressurization. Plastic is also commonly known as synthetic resin. A final product made from plastic has a lot of molecular weight but it also has fluidity, so it is easy to produce various types of products from plastic. The main component of plastic is petroleum, so plastic can be produced by types of polymer. Depending on the users' needs, materials can be polymerized to produce a highly polymerized compound with various functions and characteristics. Hence, the use and popularity of plastic is continuously growing.

However, since plastic is a type of petroleum compound, mainly petroleum, it does not decompose easily. Plastic has excellent substantiality and durability, so it lasts or can be used for a long time. It is light because it is a polymer based product. Plastic is also highly extrudable, formable and shapeable to produce various types of products. Plastic is widely used from living goods to industrial goods because it is light and durable. But there are problems, particularly environmental problems, with plastic products after their use because they do not decompose easily. The disposal problem associated with waste plastic is growing daily because of ever increasing use of plastic products. The waste plastic cannot be buried easily because of its resolvability, it does not decompose readily like paper-based products. When waste plastics are burned, various harmful gases are emitted, thereby polluting the air. Handling waste plastic is a huge problem for everyone. In addition, oil reserves including petroleum used in producing plastics are being rapidly depleted. So, there is a strong need for recycling oil from waste plastics and is only growing with the decrease in worldwide oil reserves.

Apparatus for restoring waste plastic has been proposed to recycle waste materials which attempts to convert and collect oil in the waste plastic. However, these currently available system are merely combination of various separate apparatuses and are problematic because of their slow processing speeds and low efficiency of converting waste plastic to oil. Losses typically occur when pyrolyzed gas are moved from one apparatus to another apparatus.

Moreover, currently available apparatus for restoring waste plastic can be potentially hazardous to workers from the high temperature exhaust when the cover of the decomposer is opened. To avoid such problem, the decomposer must be cooled for long time, thereby introducing processing delay and greatly reducing the conversion efficiency because subsequent waste plastic must wait until the decomposer is sufficiently cooled to be safely handled by the worker.

OBJECT AND SUMMARY OF THE INVENTION

Therefore, it is an object of the claimed invention to solve the aforementioned problems with the prior art apparatus. The claimed oil reduction apparatus for restoring or reducing plastics, preferably waste plastics, to oil comprises a decomposer to efficiently heat the decomposition space to pyrolyze the waste plastics partly before selectively heating the decomposition space and reducing pyrolyzed gas to oil by cooling. In accordance with an exemplary embodiment of the claimed invention, the decomposer selectively heats the decomposition space to pyrolyze the waste plastics based on the volume of the waste plastics in the decomposition space and continuously cooling the pyrolyzed gas produced from the pyrolyzed waste plastic to reduce the pyrolyzed gas to oil, thereby effectively increasing the reduction efficiency and reducing the process time required to reduce the waste plastics to oil.

In accordance with an exemplary embodiment of the claimed invention, an oil reduction apparatus comprises a decomposer, an oil reduction body, a cooling tank, and a filter and emission part. The decomposer is covered with a layer of insulation and comprises a decomposition space comprising an opening to receive the plastic, a heating coil inside the decomposer to heat the decomposition space to pyrolyze the plastic, and a pyrolyzing gas exhaust pipe in an upper part of the decomposer connected to the decomposition space to exhaust pyrolyzing gas produced in pyrolyzing the plastic. The oil reduction body positioned in one side of the decomposer is divided into two parts by a partition. The first part is a cooling space connected to the pyrolyzing gas exhaust pipe to receive the pyrolyzing gas from the decomposition space and the second part is an oil catchment space to collect oil reduced from the pyrolyzing gas. The cooling tank is positioned in one side of the reduction body and connected to the cooling space of the oil reduction body. The cooling tank provides cooling water to the cooling space to cool and reduce the pyrolyzing gas to oil. The filter and emission part is positioned in another side of the reduction body and connected to the oil catchment space of the oil reduction body to filter the oil reduced from the pyrolyzing gas, which is collected in the oil catchment space of the oil reduction body.

In accordance with an exemplary embodiment of the claimed invention, oil reduced from the pyrolyzed gas by cooling with the cooling water in the cooling space of the oil reduction body flows to the upper position of the cooling space by gravity being lighter than the water and to the oil catchment space over the partition separating the cooling space and the oil catchment space in the oil reduction body.

In accordance with an exemplary embodiment of the claimed invention, the oil reduction apparatus further comprises a crusher to crush plastic, a crushing conveyor to move the crushed plastic from the crusher, and a storage tank to store the crushed waste plastic to be supplied to the decomposer. Preferably, the decomposer is located at one end of the crushing conveyor to receive the crushed plastic from the crushing conveyor. The utilization of the storage tank can shorten any potential producing delay by making the waste plastic crushed by the crusher readily available to the decomposer. That is, the decomposer does not have to wait for enough supply of crushed waste plastic. because the waste plastic is crushed in a crusher and reserved. Preferably, the storage tank can be positioned between the crushing conveyor and the decomposer to store the crushed plastic from the crusher to efficiently supply the decomposer to minimize any potential wait time for the decomposer.

In accordance with an exemplary embodiment of the claimed invention, the decomposer comprises a cooling inflow hole connected to the decomposition space in one side of the decomposer, a cooling emission hole connected to the decomposition space in another side of the decomposer, a cooling fan to supply an inflow of air to the decomposition space through the cooling inflow hole to cool pyrolyzed plastic in the decomposition space, and a cooling exhaust pipe connected to the cooling emission hole to exhaust the inflow of air from the decomposition space. Preferably, the cooling insert hole and the cooling emission hole at each side of the decomposer are linked to the decomposition space. The cooling air from the cooling fan is supplied to the decomposition space through the cooling insert hole. After cooling the decomposition space, namely the pyrolyzed waste plastic in the decomposition space, the air is exhausted to the outside of the decomposition space through the cooling emission hole.

In accordance with an exemplary embodiment of the claimed invention, the cooling space of the oil reduction body continuously cools the pyrolyzing gas to reduce the pyrolyzing gas to oil using the cooling water from the cooling tank.

In accordance with an exemplary embodiment of the claimed invention, the oil reduced from the pyrolyzing gas in the cooling space of the oil reduction body being lighter than the cooling water rises to the top or upper position of the cooling space by gravity and traverses the partition into the oil catchment space of the oil collection body to collect the oil reduced from the pyrolyzing gas.

In accordance with an exemplary embodiment of the claimed invention, the partition has a passageway between the cooling space and the oil catchment space for the oil reduced from the pyrolyzing gas to flow from the cooling space to the oil catchment space.

In accordance with an exemplary embodiment of the claimed invention, the heating coil of the oil reduction apparatus comprises an upper heating coil located in an upper part of the decomposition space of the decomposer, a side heating coil located on the side of the decomposition space of the decomposer, and a lower heating coil located in an lower part of the decomposition space of the decomposer. The oil reduction apparatus further comprises a control part to independently and selectively control operation of the upper, side and lower heating coils to selectively heat one or more area of the decomposition space.

In accordance with an exemplary embodiment of the claimed invention, the control part selectively and independently controls the operation of the upper, side and lower heating coils based on a volume of crushed plastic in the decomposition space.

In accordance with an exemplary embodiment of the claimed invention, the oil reduction apparatus further comprises a door, a sealed body, a sealed groove, a ring groove, a sealed elastic body, a sealed protrusion, and a sealed ring. The sealed body protrudes from the opening of the decomposition space on one side of the decomposer. The sealed groove is positioned around the opening of the decomposition space on the sealed body. The ring groove is positioned around the sealed groove. The door rotates on a door hinge to open and close the sealed body. The sealed elastic body relieves the impact of the door closing on the decomposer and the sealed body. The sealed protrusion protrudes from an inner side of the door toward the sealed groove and inserts into the sealed groove when the door is closed. The sealed ring is positioned on an inner surface of the door and configured to be inserted into the ring groove when the door is closed. The sealed groove, the ring groove, the sealed protrusion and the sealed ring operate to provide an air tight seal between the door and the seal body when the door is closed. In accordance with an aspect of the claimed invention, the door is a rotational door with the door hinge located on a side of the decomposer to open and close opened decomposition space. The sealed elastic body works to as a shock buffer when the door is closed.

In accordance with an exemplary embodiment of the claimed invention, the oil reduction apparatus further comprises a remaining gas exhaust pipe positioned in an upper part of the decomposer and connected to the decomposition place. The remaining gas exhaust pipe opens and closes to exhaust gas remaining inside the decomposition space.

In accordance with an exemplary embodiment of the claimed invention, the oil reduction apparatus further comprises a cooling water supply pipe, a circulation pump, and a cooling water collecting pipe. The cooling water supply pipe is located in a lower part of oil reduction body and is connected to the cooling tank to supply the cooling water to the cooling space of the oil reduction body. The circulation pump supplies cooling water with a predetermined pressure from the cooling tank through the cooling water supply pipe to the cooling space of the oil reduction body. The cooling water collecting pipe collects and recycles the cooling water from the cooling space of the oil reduction body to maintain a predetermined level of cooling water in the cooling space of the oil reduction body. That is, the cooling water stored in the cooling tank is supplied to the cooling space of the oil reduction body through the cooling water supply pipe by the pressure of the circulation pump. The cooling water cools the pyrolyzing gas received from the decomposer through the pyrolyzing gas exhaust pipe to reduce pyrolyzing gas to oil. The cooling water supplied to the cooling space of the oil reduction body can return and re-circulate to the cooling tank through the cooling water collection pipe.

In accordance with an exemplary embodiment of the claimed invention, the filter and emission part comprises a filtering body, an oil pump and a filtering exhaust pipe. The filtering body has a filtering space to filter the oil reduced from the pyrolyzing gas and collected in the oil collecting space of the oil reduction body. The filtering exhaust pipe is connected to the filtering body through which filtered oil is output from the filtering space. The oil pump supplies the filtered oil with an outbound pressure from the filtering space of the filtering body.

In accordance with an exemplary embodiment of the claimed invention, the oil reduction apparatus continually performs the operation of crushing, pyrolyzing and oil reduction by cooling, thereby shorten the processing time, increasing the oil reduction efficiency, and minimizing gas losses. In accordance with an exemplary embodiment of the claimed invention, the decomposition space of the decomposer is partly heated to reduce the volume of plastic, preferably waste plastic, before pyrolyzing the waste plastic. By performing pyrolyzation on the heated waste plastic or heated decomposition space, the oil reduction apparatus can advantageously minimize the consumption of energy to pyrolyze the waste plastic. Also, after cooling the pyrolyzed waste plastic in the decomposer with a cooling air from the cooling part, the oil reduction apparatus of the claimed invention quickly cools the pyrolyzed gas to reduce it to oil, thereby greatly increasing the efficiency of the oil reduction process. That is, the oil is separated from the gas by the cooling water circulating in the cool space of the oil reduction body.

In accordance with an exemplary embodiment of the claimed invention, a method for reducing oil from plastic comprises the steps of heating a decomposition space of a decomposer with a heating coil inside the decomposer to pyrolyze the crushed plastic in the decomposition space of the decomposer to provide pyrolyzing gas, exhausting the pyrolyzing gas produced in pyrolyzing the crushed plastic from the decomposition space of the decomposer to an oil reduction body divided into a cooling space and an oil catchment space by a partition, continuously cooling the pyrolyzing gas in a cooling space of the oil reduction body containing cooling water to reduce the pyrolyzing gas to oil, collecting the oil reduced from the pyrolyzing gas rising to top of the cooling space and traversing the partition from the cooling space into the oil catchment space of the oil reduction body, and filtering the oil reduced from the pyrolyzing gas and collected in the oil catchment space of the oil reduction body.

In accordance with an exemplary embodiment of the claimed invention, the oil reduction method cruses the plastic by a crusher to provide crushed plastic, transfers the crushed plastic to the decomposition space of the decomposer covered with a layer of insulation, and stores the crushed plastic in a storage tank to efficiently supply the decomposer.

In accordance with an exemplary embodiment of the claimed invention, the oil reduction method supplies an inflow of air to the decomposition space to cool pyrolyzed plastic in the decomposition space.

In accordance with an exemplary embodiment of the claimed invention, the decomposition space of the decomposer is heated using a heating coil. The heating comprises an upper heating coil located in an upper part of the decomposition of the decomposer, a side heating coil located on the side of the decomposition space of the decomposer, and a lower heating coil located in an lower part of the decomposition space of the decomposer. The oil reduction method of claimed invention independently and selectively controls the upper, side and lower heating coils to selectively heat one or more area of the decomposition space.

In accordance with an exemplary embodiment of the claimed invention, the oil reduction method selectively and independently controls the upper, side and lower heating coils based on a volume of crushed plastic in the decomposition space.

In accordance with an exemplary embodiment of the claimed invention, the oil reduction method supplies cooling water to the cooling space from a cooling tank.

In accordance with an exemplary embodiment of the claimed invention, the oil reduction method supplies pressurized cooling water to the cooling space from the cooling tank using a circulation pump.

In accordance with an exemplary embodiment of the claimed invention, the oil reduction method filters the oil reduced from the pyrolyzing gas and collected in the oil catchment space of the oil reduction body using a filtering body having a filtering space and pressurizes the filtered oil using an oil pump to supply pressurized filtered oil from the filtering space through a filtering exhaust pipe.

Various other objects, advantages and features of the claimed invention will become readily apparent from the ensuing detailed description, and the novel features will be particularly pointed out in the appended claims.

BRIEF DESCRIPTION OF THE DRAWINGS

The present invention is further explained in the description which follows with reference to the drawings, illustrating, by way of non-limiting examples, various embodiments of the invention, with like reference numerals representing similar parts throughout the several views, and wherein.

DETAILED DESCRIPTION OF THE EMBODIMENTS

Figure 1:
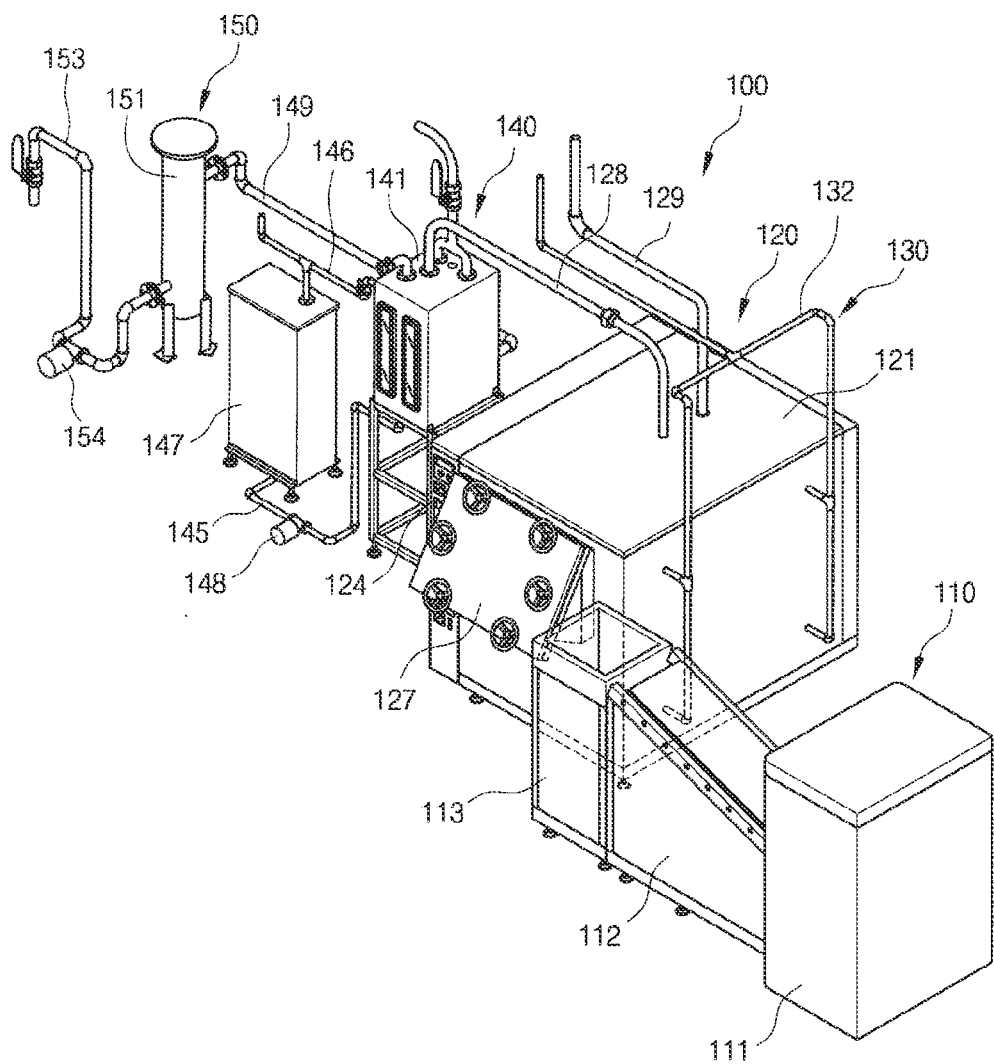
FIG. 1 shows a side perspective view of an apparatus for restoring oil from waste plastic to oil in accordance with an exemplary embodiment of the claimed invention.
Figure 2:
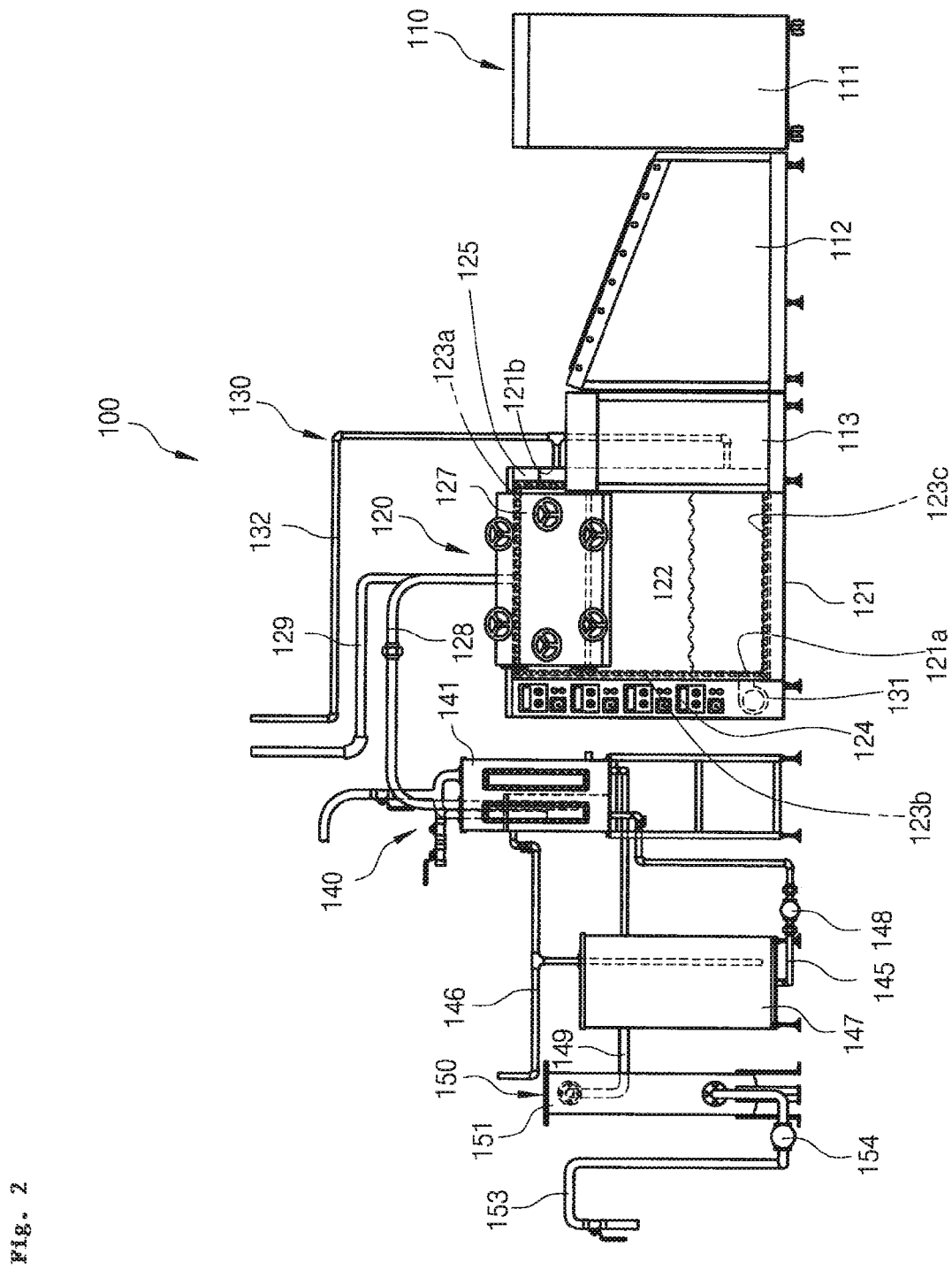
FIG. 2 shows a front perspective view of an apparatus for restoring waste plastic to oil in accordance with an exemplary embodiment of the claimed invention.
Figure 3:
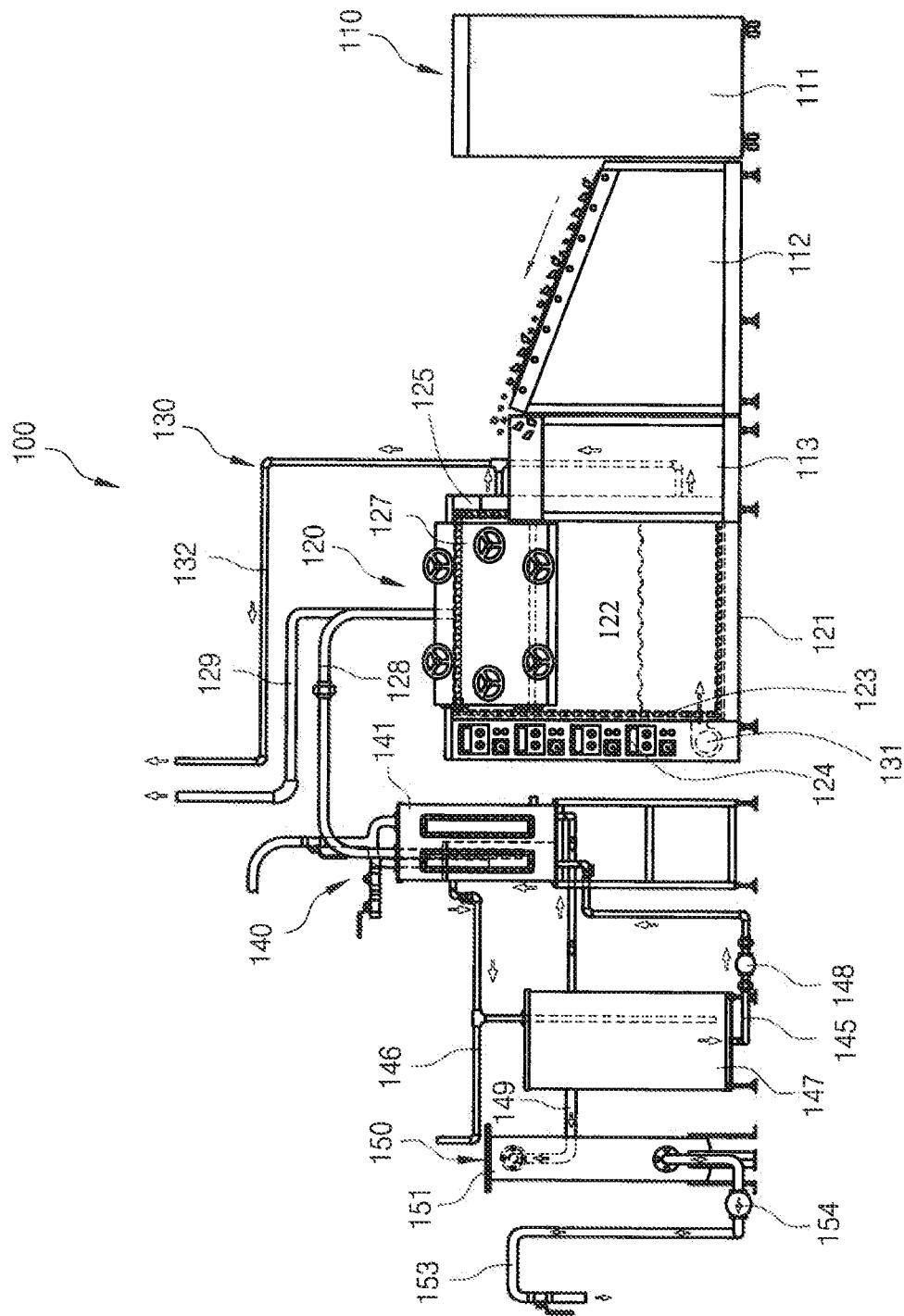
FIG. 3 shows a perspective view of an apparatus for restoring waste plastic to oil in accordance with an exemplary embodiment of the claimed invention.

As exemplary shown in FIGS. 1-3, an apparatus (100) for restoring waste plastic to oil in accordance with an exemplary embodiment of the claimed invention comprises a crush producing part (110), a pyrolyzing part (120), a furnace cooling part (130), an oil reduction part (140), and a filter and emission part (150).

Figure 4:
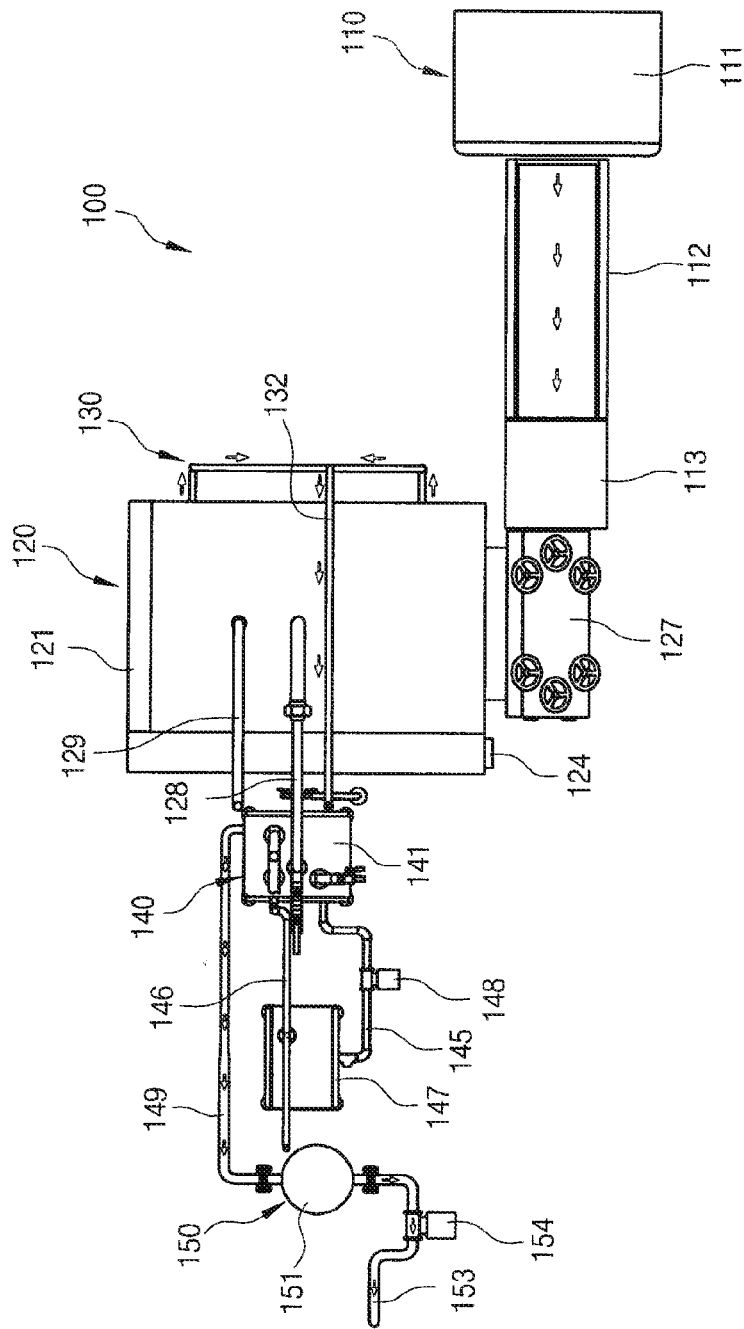
FIG. 4 shows a perspective view of an apparatus for restoring waste plastic to oil in accordance with an exemplary embodiment of the claimed invention.
Figure 5:
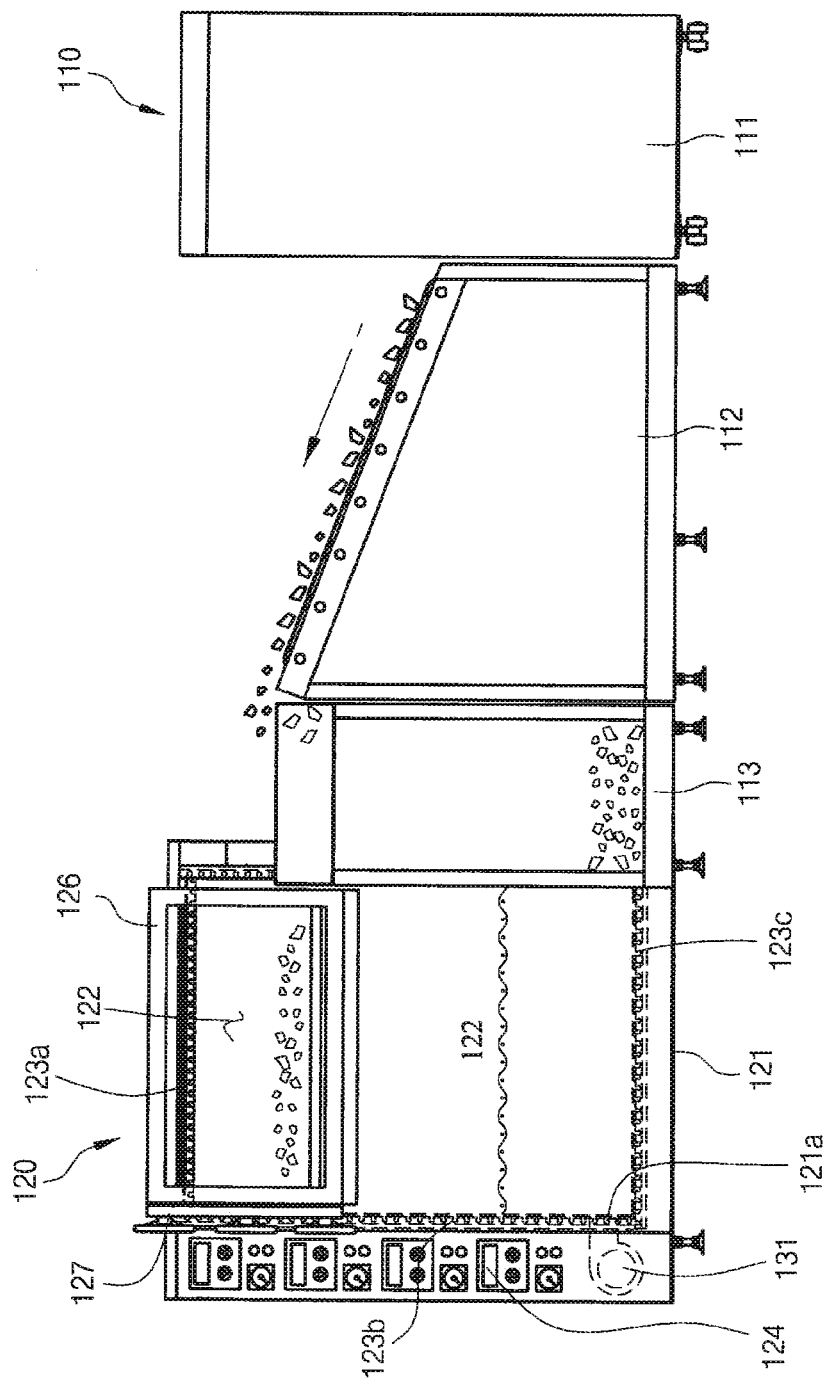
FIG. 5 shows a perspective view of a crush producing part and a heat pyrolyzing part of an apparatus for restoring waste plastic to oil in an accordance with an exemplary embodiment of the claimed invention.

In accordance with an exemplary embodiment of the claimed invention, the crush producing part (110) comprises a crusher (111), a crushing conveyer (112) and a storage tank (113), as exemplary shown in FIGS. 4-5. The crusher (111) in accordance with an exemplary embodiment of the claimed invention is configured such that at higher position crushed waste plastic is produced by crushing the waste plastic from outside to inside. Preferably, the crusher (111) produces waste plastic towards the direction of the crushing conveyor (112). It is appreciated that any known crusher can be used with the claimed apparatus, and details of various known crushers are well known to one of ordinary skill in the art and are incorporated herein in their entirety.

The crushing conveyer (112) in accordance with an exemplary embodiment of the claimed invention is located in a section of the crusher (111) and moves the crushed waste plastic in the crusher (111) to the storage tank (113). It is appreciated that any conveyor can be used with the claimed apparatus, and details of various known conveyors are well known to one of ordinary skill in the art and are incorporated herein in their entirety.

As exemplary shown in FIG. 5, the storage tank (113) in accordance with an exemplary embodiment of the claimed invention is located in between the crushing conveyer (112) and the pyrolyzing part (120). The storage tank (113) stores the crushed waste plastic received from the crusher (111) via the crushing conveyor (112), so the crushed waste plastic is readily available to the pyrolyzing part (120). This will minimize any potential wait time, and increase the output throughput and efficiency of the pyrolyzing part (120).

Figure 6:
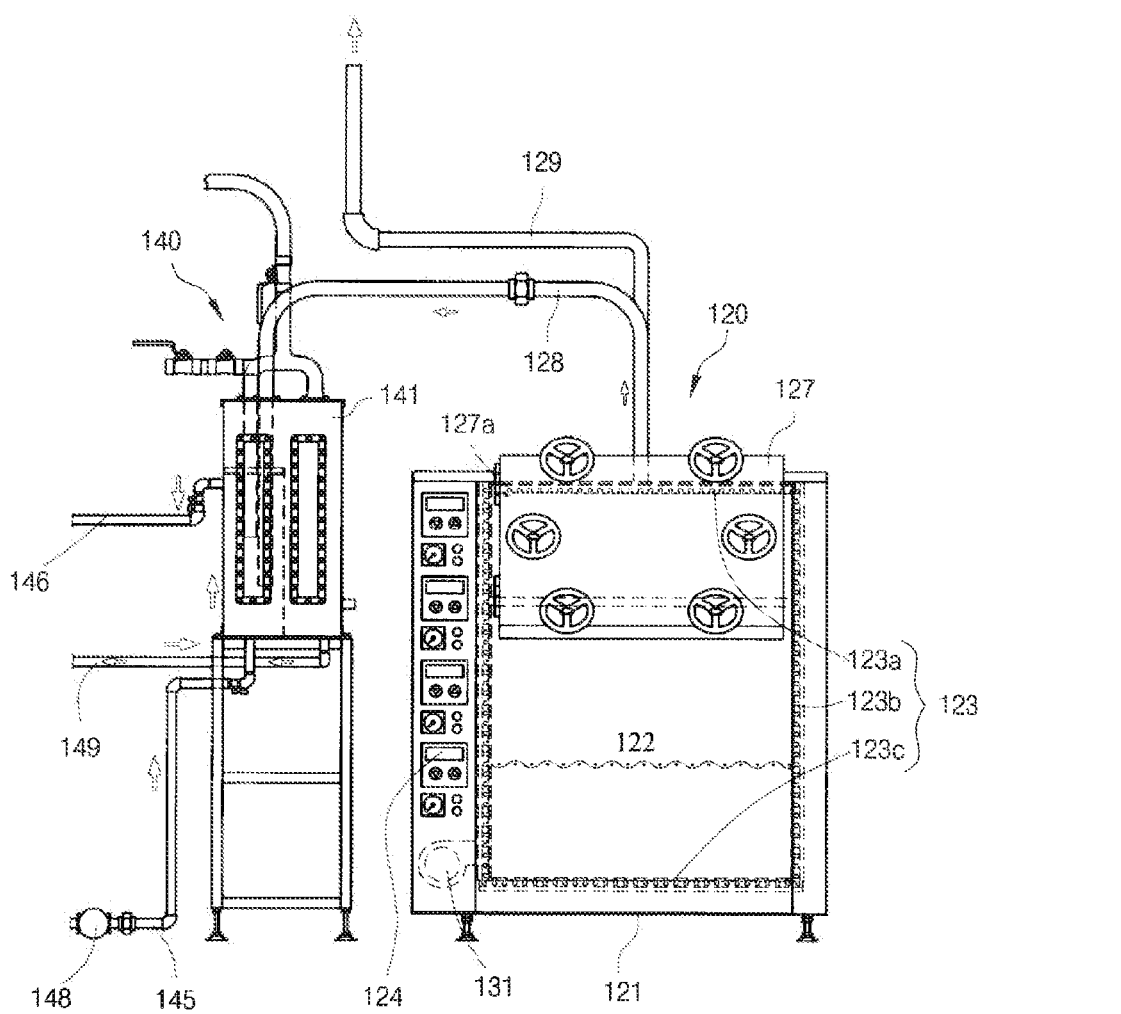
FIG. 6 shows a perspective view of a pyrolyzing part and an oil reducing part of apparatus for restoring waste plastic to oil in accordance with an exemplary embodiment of the claimed invention.
Figure 9:
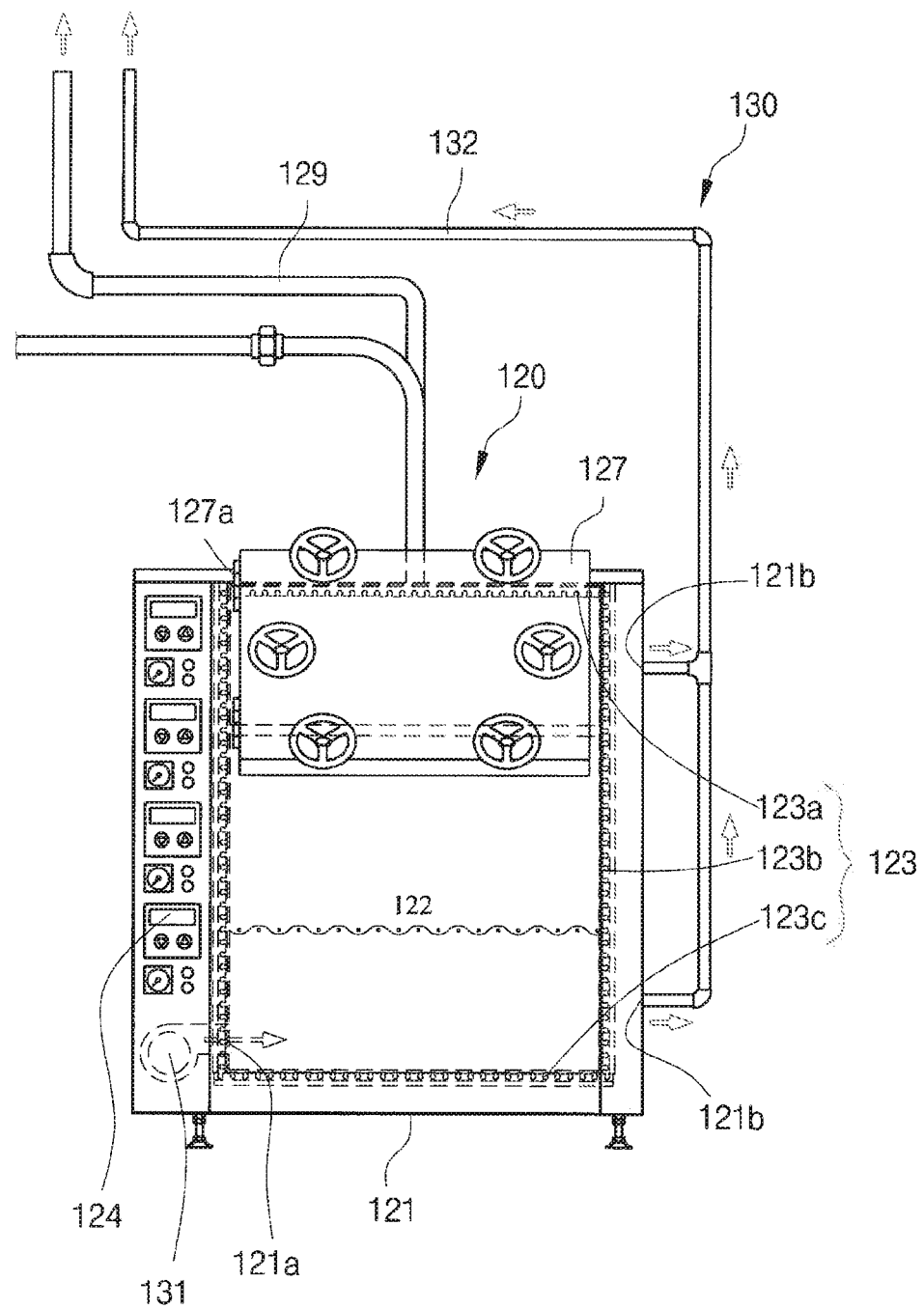
FIG. 9 shows a perspective view of a pyrolyzing part and a furnace cooling part of an apparatus for restoring waste plastic to oil in accordance with an exemplary embodiment of the claimed invention.

As exemplary shown in FIGS. 6 and 9, the pyrolyzing part (120) in accordance with an exemplary embodiment of the claimed invention comprises a decomposer (121) for pyrolyzing the waste plastic, a heating coil (123), a control part (124), a sealed body (126), a sealed elastic body (126c), a door (127), a pyrolyzing gas exhaust pipe (128) and a remaining gas exhaust pipe (129).

In accordance with an exemplary embodiment of the claimed invention, the decomposer (121) is located in a section of the storage tank (113). Inside the decomposer (121) comprises a decomposition space (122) which is opened to receive waste plastic and insulated by an insulation layer (125) from the outside. An opened side of a decomposer (121) is connected to the storage tank (113), and thereby permitting the waste plastic to be moved to the decomposition space (122) inside the decomposer (121) from the storage tank (113). The waste plastic is then pyrolyzed in the decomposition space (122) inside the decomposer (121) insulated by the insulation layer (125).

The decomposer (121) in accordance with an exemplary embodiment of the claimed invention connected has a cooling inflow hole (121a) at one side and a cooling emission hole (121b) at the other side of the decomposer (121), as exemplary shown in FIG. 9. Additionally the cooling inflow hole (121a) and the cooling emission hole (121b) are connected to the furnace cooling part (130) to cool the decomposition space (122) inside of the decomposer (121).

The heating coil (123) in accordance with an exemplary embodiment of the claimed invention is located on the outer boundary of the decomposition space (122) inside the decomposer (121) to heat and pyrolyze the waste plastic within the decomposition space (122) inside the decomposer (121). In accordance with an exemplary embodiment of the claimed invention, the heating coil (123) comprises an upper heating coil (123a) located within the upper part of the decomposition space (122) inside the decomposer (121), a side heating coil (123b) located within the side part of the decomposition space (122) inside the decomposer (121), and a lower heating coil (123c) located within the lower part of the decomposition space (122) inside the decomposer (121), as exemplary shown in FIGS. 2-3, 5-6 and 9.

In accordance with an exemplary embodiment of the claimed invention, the heating coil (123) is configured to operate selectively to maximize energy and operational efficiency. The heating coil (123) selectively operates as a function of the volume of waste plastic in the decomposition space (122). That is, when the waste plastic is introduced to the decomposition space (122), all three upper, side and lower heating coils (123a, 123b, 123c) are operational to pyrolyze the waste plastic partly. When the volume of the waste plastic in the decomposition space (122) is reduced on pyrolyzing, the number of heating coils in operation is reduced, for example only the side heating coil (123b) and lower heating coil (123c) are in operation. In accordance with an exemplary embodiment of the claimed invention, the control part (124) located on a side of the decomposer (121) independently and selectively controls the operation of the upper heating coil (123a), the side heating coil (123b) and the lower heating coil (123c).

Figure 10:
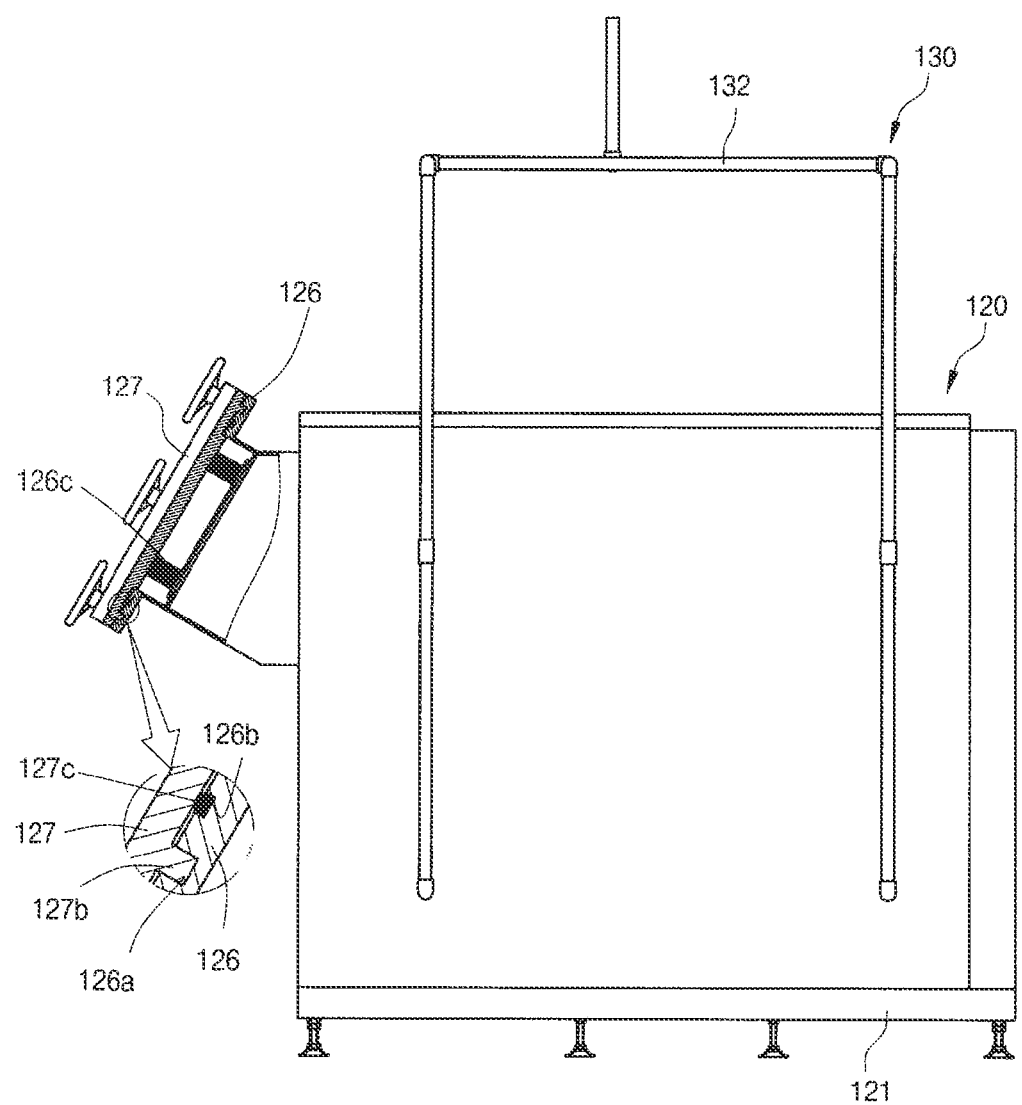
FIG. 10 shows a perspective view of a pyrolyzing part of an apparatus for restoring waste plastic to oil in accordance with an exemplary embodiment of the claimed invention.

A sealed body (126) in accordance with an exemplary embodiment of the claimed invention, as shown in FIG. 10, protrudes from a side of the decomposer (121) and protrudes out from a side of opened decomposition space (122) of the decomposer (121). The sealed body (126) contacts door (127) opening and closing the decomposition space (122) of the decomposer (121) so as to seal the decomposer (121). In accordance with an exemplary embodiment of the claimed invention, the sealed body comprises a sealed groove (126a) which surrounds boundary or outline of the open section of a decomposition space (122) of the decomposer (121) and a ring groove (126b) which surrounds the outline of the sealed groove (126b).

The sealed body (126) in accordance with an exemplary embodiment of the claimed invention comprises a sealed elastic body (126c) located in a side of the decomposer (121) and in an open side of the decomposition space (122) of the decomposer (121), such that the sealed elastic body (126c) acts as buffer on the closing of the door (127). The sealed elastic body (126c) in accordance with an exemplary embodiment of the invention is formed as a type of spring with elastics acting like buffer for the door (127).

The door (127) in accordance with an exemplary embodiment of the claimed invention is located on a side of the decomposer (121) and configured to rotate around a door hinge (127a) formed on a side of the decomposer (121), as exemplary shown in FIGS. 6 and 10. The door (127) is configured to close and open a side of the decomposition space (122) of the decomposer (121) to move the waste plastic to the decomposition space (122) of the decomposer (121) in an open state and to prevent leakage of gas on the close state when the decomposer (121) is pyrolyzing waste plastic.

As shown in FIG. 10, in accordance with an exemplary embodiment of the claimed invention, the door (127) comprises a sealed protrusion (127b) configured to be inserted to the sealed groove (126a) at a direction of the door (127) to the decomposition space (122) of the decomposer (121), and a sealed ring (127c) configured to be inserted to the ring groove (126b) away from the sealed protrusion (127b). The sealed protrusion (127b) and the sealed ring (127c) are respectively inserted to the sealed groove (126a) and the ring groove (126b) to strengthen the sealing capacity of opened side of the decomposition space (122) of the decomposer (121).

The door (127) rotates around the door hinge (127a) to open and close the open side of the decomposition space (122) of the decomposer (121). The sealed protrusion (127b) and sealed ring (127c) act as a buffer to minimize the impact of the door (127) closing on the decomposer (121) and are respectively inserted to sealed groove (126a) and the ring groove (126b) to strengthen the seal between the door and the decomposer (121).

The pyrolyzing gas exhaust pipe (128) in accordance with an exemplary embodiment of the claimed invention is located in the upper position of the decomposer (121) and linked to the decomposition space (122) of the decomposer (121), as exemplary shown in FIGS. 4, 6 and 9. The pyrolyzing gas exhaust pipe (128) outputs gas generated in the pyrolyzing of the waste plastic to the oil reduction part (140). In accordance with an exemplary embodiment of the claimed invention, the pyrolyzing gas exhaust pipe (128) is linked to the decomposer (121) and an oil reduction body (141) of the oil reduction part (140). The pyrolyzing gas exhaust pipe (128) outputs the pyrolyzing gas produced by the decomposer (121) from pyrolyzing the waste plastic to the oil reduction body (141) of the oil reduction part (140).

The remaining gas exhaust pipe (129) in accordance with an exemplary embodiment of the claimed invention is located in the upper part of the decomposer (121) and to a side of the pyrolyzing gas exhaust pipe (128) connected to the decomposition space (122) of the decomposer (121), as exemplary shown in FIG. 4. The remaining gas exhaust pipe (129) is configured to exhaust the remaining gas after exhausting the pyrolyzing gas of the pyrolyzed waste plastic through the pyrolyzing gas exhaust pipe (128). A detailed explanation relating to the operation of the remaining gas exhaust pipe (129), particularly the necessity of closing and opening of the remained gas exhaust pipe (129), will be skipped since these operations are well known to one of ordinary skilled in the art.

In accordance with an exemplary embodiment of the claimed invention, the furnace cooling part (130) comprises a cooling fan (131) and a cooling exhaust pipe (132) located on a side of the decomposer (121), as exemplary shown in FIG. 9. In accordance with an aspect of the claimed invention, the cooling fan (131) is located in a side of a decomposer (121) and connects to the cooling inflow hole (121*a*). The cooling fan (131) operates in the side of the decomposer (121) and provides an inflow of cooling air to the decomposition space (122) of the decomposer (121) through the cooling inflow hole (121*a*). As exemplary shown in FIG. 9, the cooling exhaust pipe (132) is located on the other side of the cooling fan (131) on the decomposer (121) and connects to the cooling emission hole (121*b*) to exhaust air from the decomposition space (122) of the decomposer (121) originating from the cooling fan (131).

Figure 7:
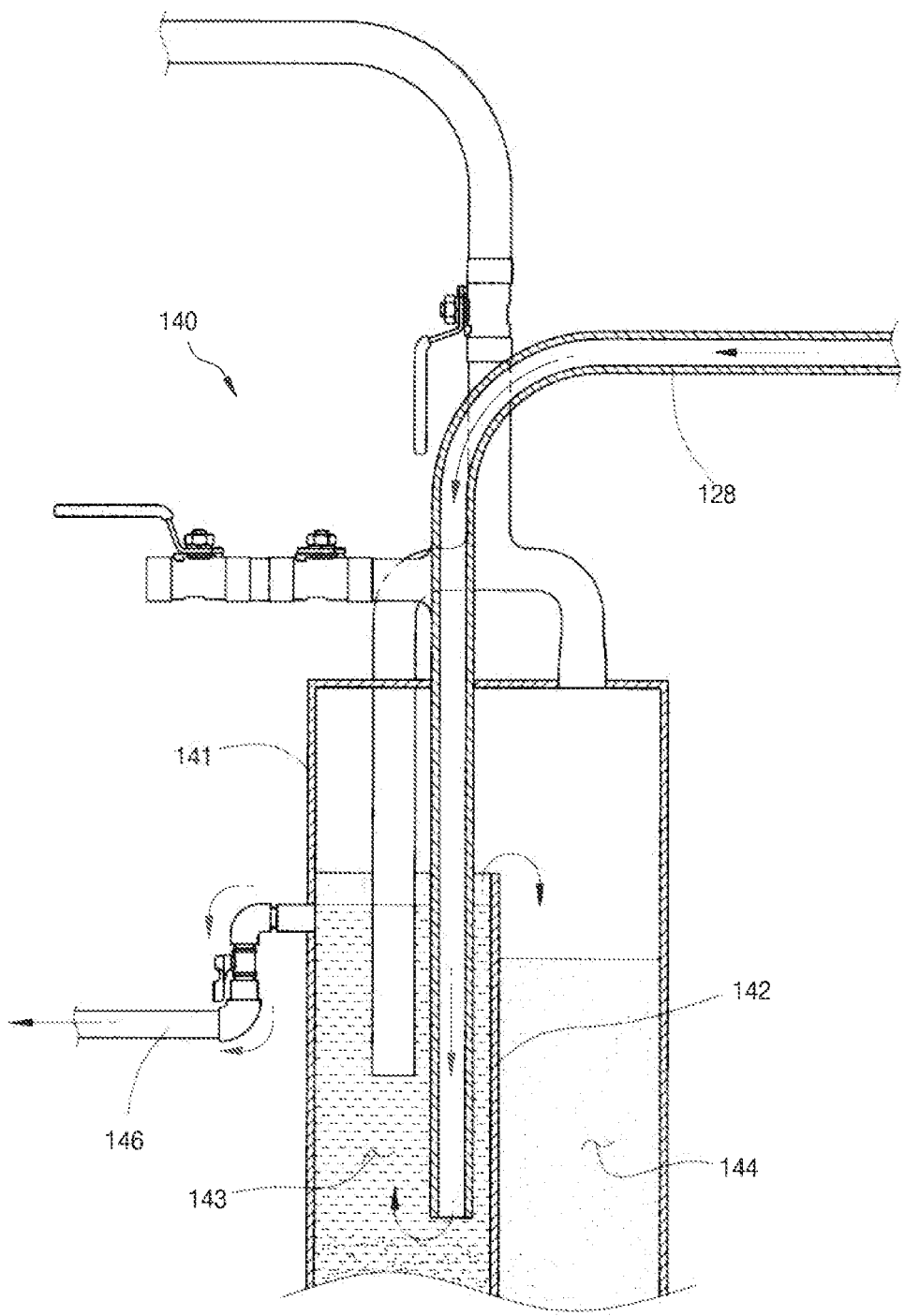
FIG. 7 shows a perspective view of an oil reducing part and a main part of an apparatus for restoring waste plastic to oil in accordance with an exemplary embodiment of the claimed invention.
Figure 8:
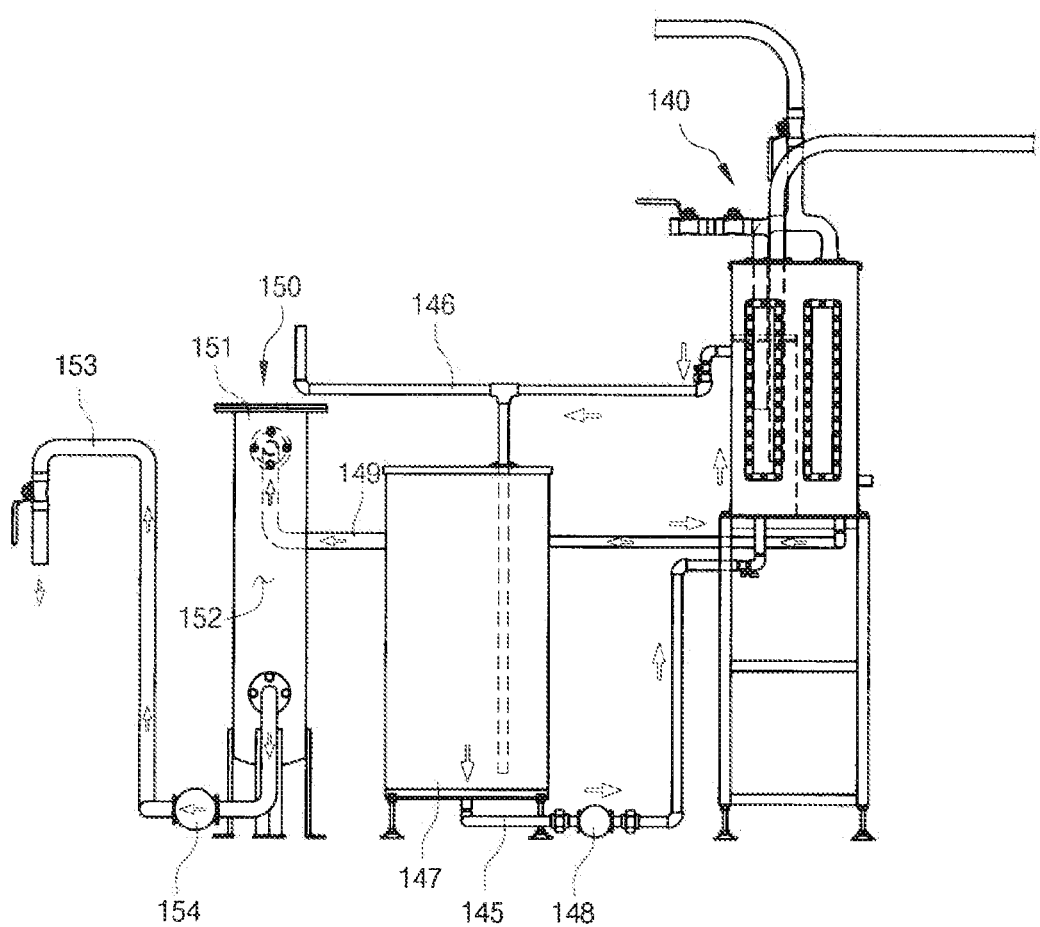
FIG. 8 shows a perspective view of an oil reducing part and a filter exhausting part of an apparatus for restoring waste plastic to oil in accordance with an exemplary embodiment of the claimed invention.

In accordance with an exemplary embodiment of the claimed invention, as exemplary shown in FIGS. 7-8, the cooling water supply pipe (145) supplies the cooling water from the cooling tank (147) to a cooling space (143) in the oil reduction body (141) of the oil reduction part (140). In the oil reduction body (141), the cooling water in the cooling space (143) operates to freeze the air infused with the pyrolyzed gas from the decomposer (121) through the pyrolyzing gas exhaust pipe (128), so as to reduce the pyrolyzed gas to oil or extract oil from the pyrolyzed gas.

As exemplary shown in FIGS. 4 and 8, the cooling water supply pipe (145) is attached on one side the oil reduction body (141) and the other side to the cooling tank (147). The cooling water supply pipe (145) and a circulation pump (148) maintain a predetermined level of cooling water in the cooling space (143). When the cooling water level is high in the cooling space (143), the excess cooling water is collected into the cooling tank (147) through a cooling water collection pipe (146). In accordance with an aspect of the claimed invention, as exemplary shown in FIG. 7, the oil reduction body (141) is divided or partitioned into two parts: the cooling space (143) and the oil catchment space (144). Preferably, the cooling water collection pipe (146) is located on the side of the reduction body (141) to keep the cooling water level lower than the height of the partition separating the cooling space (143) and the oil catchment space (144), as exemplary shown in FIG. 7.

The cooling water collection pipe (146) is a pipe through which the excess cooling water is collected in the cooling tank (147) so that the level of cooling water supplied to the cooling space (143) of the oil reduction body (141) is maintained at a level lower than the partition between the cooling space (143) and the oil catchment space (144) to prevent the passage of the cooling water from the cooling space (143) to the oil catchment space (144), as exemplary shown in FIG. 7. In accordance with an aspect of the claimed invention, the cooling tank (147) is located in one side of the oil reduction body (141). The cooling tank (147) stores the cooling water, supplies the cooling water to the cooling space (143) of the oil reduction body (141) through the cooling water supply pipe (145) and collects excess cooling water from the cooling space (143) through the cooling water collection pipe (146), thereby circulating the cooling water in the cooling space (143).

In accordance with an exemplary embodiment of the claimed invention, a circulating pump (148) is connected into the cooling water supply pipe (145) to supply the cooling water with a predetermined supply pressure to the cooling space (143), as exemplary shown in FIG. 8. The circulating pump (148) improves the supply efficiency by providing the cooling water stored in the cooling tank (147) with the predetermined supply pressure to the cooling space (143). Also, the cooling efficiency of the cooling water can be enhanced because the water collected from circulation, specifically excess cooling water from the cooling space (143) by the cooling tank (147) through the cooling water collection pipe (146), will have certain pressure but likely less than the predetermined supply pressure. In other words, the cooling water, which is stored in the cooling tank (147), is provided to the cooling space (143) through the cooling water supply pipe (145) by the supply pressure from the circulation pump (148) to cool off the pyrolyzed gas exhausted from the pyrolyzing gas exhaust pipe (128) and reduce the pyrolyzed gas to oil. Then the cooling water is collected through the cooling water collecting pipe (146) in the cooling tank (147) to be recirculated.

As exemplary shown in FIGS. 4 and 8, an oil exhaust pipe (149) in accordance exemplary embodiment of the claimed invention is connected into the lower part of the oil reduction body (141) and the oil catchment space (144). The oil exhaust pipe (149) connects the oil catchment space (144) in the reduction body (141) and the filter and emission part (150) to supply the oil collected in the oil catchment space (144) to the filter and emission part (150).

In accordance with exemplary embodiment of the claimed invention, the filter and emission part (150) comprises a filtering body (151) positioned near the oil reduction body (141), a filtering exhaust pipe (153), and an oil pump (154), as exemplary shown in FIGS. 4 and 8. In accordance with an aspect of the claimed invention, the filtering body (151) is placed on the other side of the oil reduction body (141), and connected to the oil exhaust pipe (149) and the filtering exhaust pipe (153) so that the filtering body (151) comprises a filtering space (152) to the collected oil received from the oil catchment space (144) in the oil reduction body (141). The filtering body (151) filters the oil from the oil exhaust pipe (149) to remove any impurities. A detailed explanation relating to the filter elements and its operation will be skipped since the filter elements are well known to one of ordinary skilled in the art.

The filtering exhaust pipe (153) in accordance with an exemplary embodiment of the claimed invention is located on one side of the filtering body (151) to supply or output oil filtered in the filtering space (152), as exemplary shown in FIGS. 1-3 and 8. In accordance with an aspect of the claimed invention, the filtering exhaust pipe (153) is place on one side of the filtering body (151) so that the filtered/restored oil can readily stored in a container (not shown), supplied to an oil based machine, and the like.

The oil pump (154) in accordance with an exemplary embodiment of the claimed invention is connected into the filtering exhaust pipe (153) to provide the filtered oil with an outbound pressure from the filtering space (152) in the filtering body (151). The oil pump (154) attached to the filtering exhaust pipe (153) supplying pressure to the filtered oil helps to exhaust the filtered oil from the filtering space (152). That is, the oil collected in the oil catchment space (144) is supplied to the filtering body (151) through the oil exhaust pipe (149) and the filtered oil in the filtering body (151) can be outputted or exhausted through the filtering exhaust pipe (154) in part due to the pressure from the oil pump (154).

Although the explanation above on the appropriate use of this invention is detailed, the range of rights on the invention is not limited on this. The various modifications and improved form based on the basic concept of this invention is also included in the range of rights on the invention.

What is claimed:

1. An oil reduction apparatus, comprising:
a decomposer, covered with a layer of insulation, to receive plastic and comprising:
  a decomposition space comprising an opening to receive the plastic;
  a heating coil inside the decomposer to heat the decomposition space to pyrolyze the plastic; and
  a pyrolyzing gas exhaust pipe in an upper part of the decomposer connected to the decomposition space to exhaust pyrolyzing gas produced in pyrolyzing the plastic;
an oil reduction body positioned in one side of the decomposer and divided into a cooling space and an oil catchment space by a partition, the cooling space being connected to the pyrolyzing gas exhaust pipe to receive the pyrolyzing gas from the decomposition space and the oil catchment space configured to collect oil reduced from the pyrolyzing gas;
a cooling tank positioned in one side of the reduction body is connected to the cooling space of the oil reduction body and provides cooling water to the cooling space to cool and reduce the pyrolyzing gas to oil; and
a filter and emission part positioned in another side of the reduction body is connected to the oil catchment space of the oil reduction body to filter the oil reduced from the pyrolyzing gas and collected in the oil catchment space of the oil reduction body.

2. The oil reduction apparatus of claim 1, wherein the cooling space of the oil reduction body continuously cools the pyrolyzing gas to reduce the pyrolyzing gas to oil using the cooling water from the cooling tank.

3. The oil reduction apparatus of claim 1, wherein the oil reduced from the pyrolyzing gas in the cooling space of the oil reduction body being lighter than the cooling water rises to the top of the cooling space; and wherein the oil catchment space of the oil collection body collects the oil reduced from the pyrolyzing gas traversing the partition from the cooling space of the oil reduction body.

4. The oil reduction apparatus of claim 1, wherein the partition has a passageway between the cooling space and the oil catchment space for the oil reduced from the pyrolyzing gas to flow from the cooling space to the oil catchment space.

5. The oil reduction apparatus of claim 1, further comprising:
a crusher to crush the plastic;
a crushing conveyor to move the crushed plastic from the crusher to decomposer; and
a storage tank positioned between the crushing conveyor and the decomposer to store the crushed plastic from the crusher to efficiently supply the decomposer to minimize any potential wait time for the decomposer.

6. The oil reduction apparatus of claim 1, wherein the decomposer comprises:
a cooling inflow hole connected to the decomposition space in one side of the decomposer;
a cooling emission hole connected to the decomposition space in another side of the decomposer;
a cooling fan to supply an inflow of air to the decomposition space through the cooling inflow hole to cool pyrolyzed plastic in the decomposition space; and
a cooling exhaust pipe connected to the cooling emission hole to exhaust the inflow of air from the decomposition space.

7. The oil reduction apparatus of claim 1, wherein the heating coil comprises an upper heating coil located in an upper part of the decomposition space of the decomposer; a side heating coil located on the side of the decomposition space of the decomposer; and a lower heating coil located in an lower part of the decomposition space of the decomposer; and further comprising a control part to independently and selectively control operation of the upper, side and lower heating coils to selectively heat one or more area of the decomposition space.

8. The oil reduction apparatus of claim 7, wherein the control part selectively and independently controls the operation of the upper, side and lower heating coils based on a volume of the plastic in the decomposition space.

9. The oil reduction apparatus of claim 1, further comprising:
a sealed body protruding from the opening of the decomposition space on one side of the decomposer;
a sealed groove positioned around the opening of the decomposition space on the sealed body;
a ring groove positioned around the sealed groove;
a door rotating on a door hinge to open and close the sealed body;
a sealed elastic body to relieve the impact of the door closing on the decomposer and the sealed body;
a sealed protrusion protruding from an inner side of the door toward the sealed groove and inserting into the sealed groove when the door is closed; and
a sealed ring positioned on an inner surface of the door and configured to be inserted into the ring groove when the door is closed; and
wherein the sealed groove, the ring groove, the sealed protrusion and the sealed ring operate to provide an air tight seal between the door and the seal body when the door is closed.

10. The oil reduction apparatus of claim 1, further comprising a remaining gas exhaust pipe positioned in an upper part of the decomposer and connected to the decomposition place, the remaining gas exhaust pipe opens and closes to exhaust gas remaining inside the decomposition space.

11. The oil reduction apparatus of claim 1, further comprising:
a cooling water supply pipe located in a lower part of oil reduction body and connected to the cooling tank to supply the cooling water to the cooling space of the oil reduction body;
a circulation pump to supply cooling water with a predetermined pressure from the cooling tank through the cooling water supply pipe to the cooling space of the oil reduction body; and
a cooling water collecting pipe to collect and recycle the cooling water from the cooling space of the oil reduction body to maintain a predetermined level of cooling water in the cooling space of the oil reduction body.

12. The oil reduction apparatus of claim 1, wherein the filter and emission part comprises:
a filtering body having a filtering space to filter the oil reduced from the pyrolyzing gas and collected in the oil collecting space of the oil reduction body;
a filtering exhaust pipe connected to the filtering body through which filtered oil is output from the filtering space; and
an oil pump to supply the filtered oil with an outbound pressure from the filtering space of the filtering body.

13. A method for reducing oil from plastic, comprising the steps of:

heating a decomposition space of a decomposer with a heating coil inside the decomposer to pyrolyze plastic in the decomposition space of the decomposer to provide pyrolyzing gas;

exhausting the pyrolyzing gas produced in pyrolyzing the plastic from the decomposition space of the decomposer to an oil reduction body divided into a cooling space and an oil catchment space by a partition;

continuously cooling the pyrolyzing gas in a cooling space of the oil reduction body containing cooling water to reduce the pyrolyzing gas to oil;

collecting the oil reduced from the pyrolyzing gas rising to top of the cooling space and traversing the partition from the cooling space into the oil catchment space of the oil reduction body; and filtering the oil reduced from the pyrolyzing gas and collected in the oil catchment space of the oil reduction body.

14. The method of claim 13, further comprising the steps of:

crushing the plastic by a crusher to provide crushed plastic;

transferring the crushed plastic to the decomposition space of the decomposer covered with a layer of insulation; and storing the crushed plastic in a storage tank to efficiently supply the decomposer.

15. The method of claim 13, further comprising step of supplying an inflow of air to the decomposition space to cool pyrolyzed plastic in the decomposition space.

16. The method of claim 13, wherein the heating coil comprises an upper heating coil located in an upper part of the decomposition of the decomposer, a side heating coil located on the side of the decomposition space of the decomposer, and a lower heating coil located in an lower part of the decomposition space of the decomposer; and further comprising the step of independently and selectively controlling the upper, side and lower heating coils to selectively heat one or more area of the decomposition space.

17. The method of claim 16, further comprising the step of selectively and independently controlling the upper, side and lower heating coils based on a volume of the plastic in the decomposition space.

18. The method of claim 13, further comprising the step of supplying cooling water to the cooling space from a cooling tank.

19. The method of claim 17, further comprising the step of supplying pressurized cooling water to the cooling space from the cooling tank using a circulation pump.

20. The method of claim 13, further comprising the steps of:

filtering the oil reduced from the pyrolyzing gas and collected in the oil catchment space of the oil reduction body using a filtering body having a filtering space; and pressurizing filtered oil using an oil pump to supply pressurized filtered oil from the filtering space through a filtering exhaust pipe.

* * * * *